United States Patent
Ikegaya

(10) Patent No.: US 11,560,209 B2
(45) Date of Patent: Jan. 24, 2023

(54) DRIVE SOURCE SWITCHING SYSTEM FOR MARINE PROPULSION DEVICE INCLUDING MULTIPLE DRIVE SOURCES, AND METHOD OF SWITCHING DRIVE SOURCES OF MARINE PROPULSION DEVICE

(71) Applicant: YAMAHA HATSUDOKI KABUSHIKI KAISHA, Iwata (JP)

(72) Inventor: Yuji Ikegaya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 161 days.

(21) Appl. No.: 17/184,632

(22) Filed: Feb. 25, 2021

(65) Prior Publication Data
US 2021/0284311 A1 Sep. 16, 2021

(30) Foreign Application Priority Data
Mar. 16, 2020 (JP) .............................. JP2020-045214

(51) Int. Cl.
*B63H 21/20* (2006.01)
*B63H 21/21* (2006.01)
*F16H 61/12* (2010.01)

(52) U.S. Cl.
CPC ............. *B63H 21/20* (2013.01); *B63H 21/21* (2013.01); *B63H 2021/205* (2013.01); *B63H 2021/216* (2013.01); *F16H 61/12* (2013.01)

(58) Field of Classification Search
CPC .. B63H 21/20; B63H 21/21; B63H 2021/205; B63H 2021/216; B63H 23/18;
(Continued)

(56) References Cited

U.S. PATENT DOCUMENTS 8,454,402 B1* 6/2013 Arbuckle .............. B63H 21/21
440/86
9,014,909 B1* 4/2015 Dengel .................. B63H 20/00
440/87

(Continued)

FOREIGN PATENT DOCUMENTS

| EP | 3 613 664 A1 | 2/2020 |
| JP | 04-102759 A | 4/1992 |
| JP | 2017-218016 A | 12/2017 |

OTHER PUBLICATIONS

Official Communication issued in corresponding European Patent Application No. 21160995.3, dated Aug. 30, 2021.

*Primary Examiner* — Andrew Polay
(74) *Attorney, Agent, or Firm* — Keating and Bennett, LLP

(57) ABSTRACT

A drive source switching system for a marine propulsion device includes a first drive source, a second drive source, a propeller shaft, a first driving member, a second driving member, a first driven member, and a second driven member that are movable in an axial direction of the propeller shaft, and a controller. The first driven member transmits a drive force generated by the first drive source to the propeller shaft when engaged with the first driving member. The second driven member transmits a drive force generated by the second drive source to the propeller shaft when engaged with the second driving member. When the controller moves the first driven member that is not engaged with the first driving member toward the first driving member, the controller moves the first driven member back when the first driven member fails to be engaged with the first driving member.

18 Claims, 11 Drawing Sheets

(58) Field of Classification Search
CPC ... B63H 20/14; B63H 20/007; Y02T 70/5236; F16H 61/12
See application file for complete search history.

(56) References Cited

U.S. PATENT DOCUMENTS

| | | | |
|---|---|---|---|
| 9,043,058 B1* | 5/2015 | Camp | B63H 21/21 |
| | | | 701/21 |
| 10,155,578 B1 | 12/2018 | Osthelder et al. | |
| 11,161,582 B2* | 11/2021 | Nakamura | B63H 23/30 |
| 2009/0215334 A1* | 8/2009 | Suzuki | B63H 23/30 |
| | | | 440/85 |
| 2016/0102759 A1* | 4/2016 | Schmidt | F16H 3/66 |
| | | | 192/3.54 |
| 2017/0349256 A1 | 12/2017 | Nakamura | |

* cited by examiner

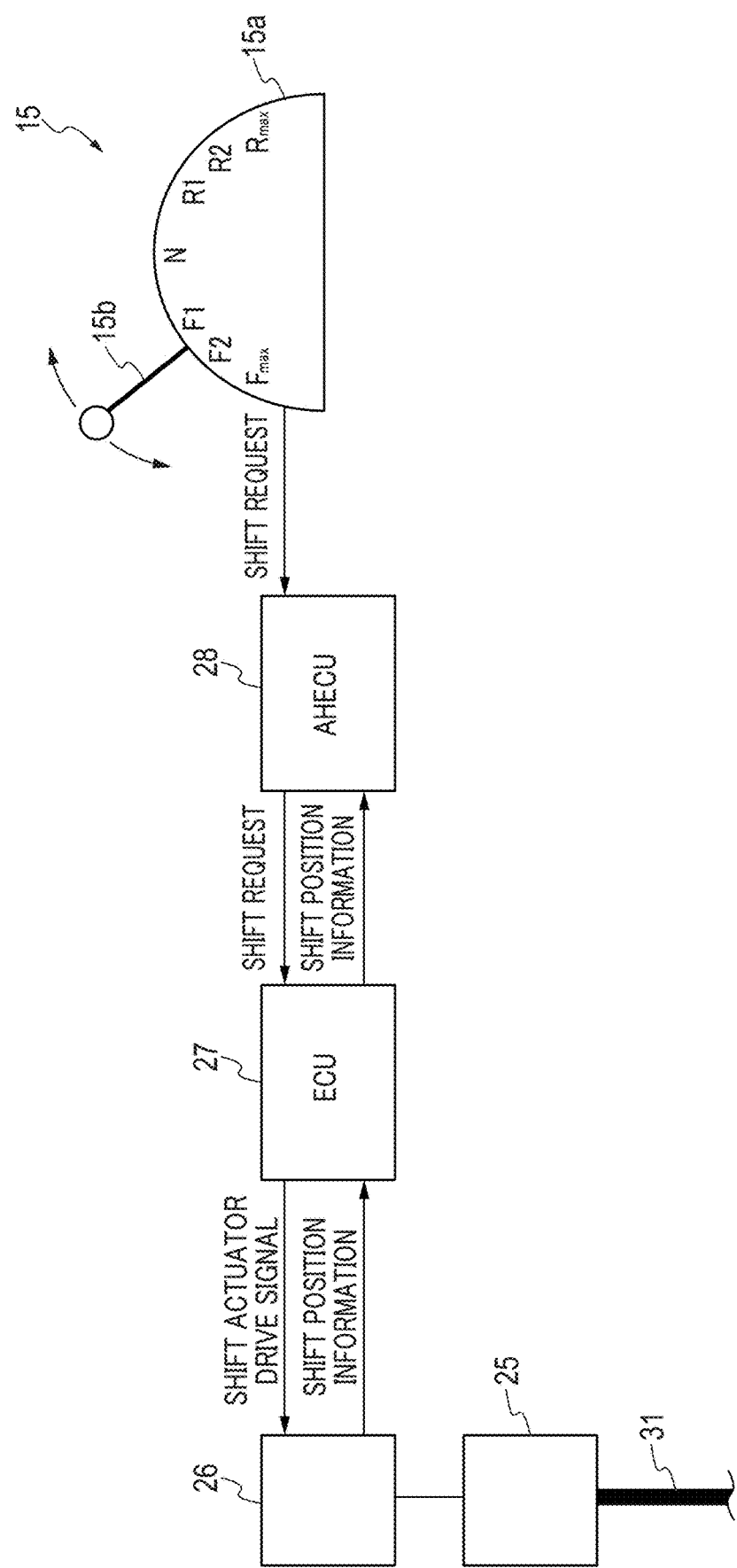

DRIVE SOURCE SWITCHING SYSTEM FOR MARINE PROPULSION DEVICE INCLUDING MULTIPLE DRIVE SOURCES, AND METHOD OF SWITCHING DRIVE SOURCES OF MARINE PROPULSION DEVICE

CROSS REFERENCE TO RELATED APPLICATIONS

This application claims the benefit of priority to Japanese Patent Application No. 2020-045214 filed on Mar. 16, 2020. The entire contents of this application are hereby incorporated herein by reference.

BACKGROUND OF THE INVENTION

1. Field of the Invention

The present invention relates to drive source switching systems for marine propulsion devices including multiple drive sources, and methods of switching drive sources of marine propulsion devices.

2. Description of the Related Art

In recent years, marine propulsion devices each including an electric motor and an internal combustion engine as its drive sources have been known. The use of an electric motor for a drive source of a marine propulsion device allows easier control of the speed of a marine vessel at very low speed, and it is suitable for correcting the position of a hull moved due to wind or waves, e.g., during fishing.

Such a marine propulsion device switches its drive source from an internal combustion engine to an electric motor by moving a shift slider coupled to a propeller shaft in the axial direction of the propeller shaft, and then meshing protrusions (teeth) provided on the shift slider with a gear (hereinafter, referred to as a "motor driven gear") driven by the electric motor. The above marine propulsion device is disclosed in, for example, Japanese Laid-open Patent Publication No. 2017-218016.

It has been proposed typically to install, in a mechanism that meshes protrusions (teeth) with a gear, a synchronizing mechanism for synchronizing the number of revolutions of the protrusions with the number of revolutions of the gear to be meshed, so that the protrusions and the gear can smoothly mesh with each other.

When an electric motor is retrofitted into a marine propulsion device, it is sometimes difficult to install the synchronization mechanism in the marine propulsion device together with the electric motor because there is not enough space in the marine propulsion device. The retrofitting of an electric motor requires miniaturization of the protrusions provided on the shift slider and the motor driven gear, and it is also difficult to apply taper processing that facilitates meshing to the edges of the protrusions and the edge of the motor driven gear from the viewpoint of securing their strength.

As a result, when the protrusions provided on the shift slider mesh with the motor driven gear an abnormal noise may be generated by collision between the protrusions and the motor driven gear. In some cases, because of unsuccessful meshing between the protrusions and the gear, the actuator that moves the shift slider continues to move the shift slider for a series of attempts to mesh the protrusions and the motor driven gear resulting in applying a large load to the drive motor of the actuator. That is, there is still room for improvement in marine propulsion devices including an electric motor together with an internal combustion engine as their drive sources in terms of switching the drive sources.

SUMMARY OF THE INVENTION

Preferred embodiments of the present invention provide drive source switching systems for marine propulsion devices including multiple drive sources and methods of switching drive sources of marine propulsion devices that each enable smooth switching of the drive sources.

According to a preferred embodiment of the present invention, a drive source switching system for a marine propulsion device includes a first drive source, a second drive source, and a propeller shaft that rotates propeller blades to generate a propulsive force. The drive source switching system further includes a first driving member to transmit a drive force generated by the first drive source, and a second driving member to transmit a drive force generated by the second drive source. The drive source switching system further includes a first driven member that is movable in an axial direction of the propeller shaft and engageable with the first driving member, and a second driven member that is movable in the axial direction of the propeller shaft and engageable with the second driving member. The drive source switching system further includes a controller configured or programmed to control a movement of the first driven member. The first driven member transmits the drive force generated by the first drive source to the propeller shaft when engaged with the first driving member. The second driven member transmits a drive force generated by the second drive source to the propeller shaft when engaged with the second driving member. When the controller controls the first driven member to move from a first position where the first driven member is not engaged with the first driving member in the axial direction of the propeller shaft toward the first driving member, the controller controls the first driven member to move back in a direction toward the first position when the first driven member fails to engage with the first driving member. The controller may move the first driven member toward the first driving member again after failure to engage with the first driving member.

According to another preferred embodiment of the present invention, a drive source switching system for a marine propulsion device includes a first drive source, a second drive source, and a propeller shaft that rotates propeller blades to generate a propulsive force. The drive source switching system further includes a drive source switching mechanism that switches, between the first drive source and the second drive source, a drive source that generates a drive force to be transmitted to the propeller shaft. The drive source switching system further includes a controller configured or programmed to control the drive source switching mechanism to switch the drive source between the first drive source and the second drive source. When switching the drive source between the first drive source and the second drive source fails, the controller temporarily interrupts the switching of the drive source between the first drive source and the second drive source. The controller may attempt to perform switching between the first drive source and the second drive source again after the failure.

According to another preferred embodiment of the present invention, a marine propulsion device includes a first drive source, a second drive source, a propeller shaft that rotates propeller blades to generate a propulsive force, a drive source switching mechanism that switches, between the first drive source and the second drive source, a drive source that generates a drive force to be transmitted to the propeller shaft, and a controller. A method of switching drive sources of the marine propulsion device includes controlling, with the controller, the drive source switching mechanism to switch the drive source between the first drive source and the second drive source, and when switching the drive source between the first drive source and the second drive source fails, temporarily interrupting, with the controller, switching of the drive source between the first drive source and the second drive source.

According to a preferred embodiment of the present invention, the controller controls the first driven member to move back in the direction toward the first position when the first driven member fails to engage with the first driving member, or, the controller temporarily interrupts the switching between the first drive source and the second drive source when the controller fails to switch between these drive sources. This reduces impossible attempts to switch between the drive sources, resulting in smooth switching of the drive sources.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a diagram explaining signal transmission in a control system to switch drive sources of the outboard motor.

DETAILED DESCRIPTION OF THE PREFERRED EMBODIMENTS

Hereinafter, preferred embodiments of the present invention will be described with reference to the drawings.

Figure 1:
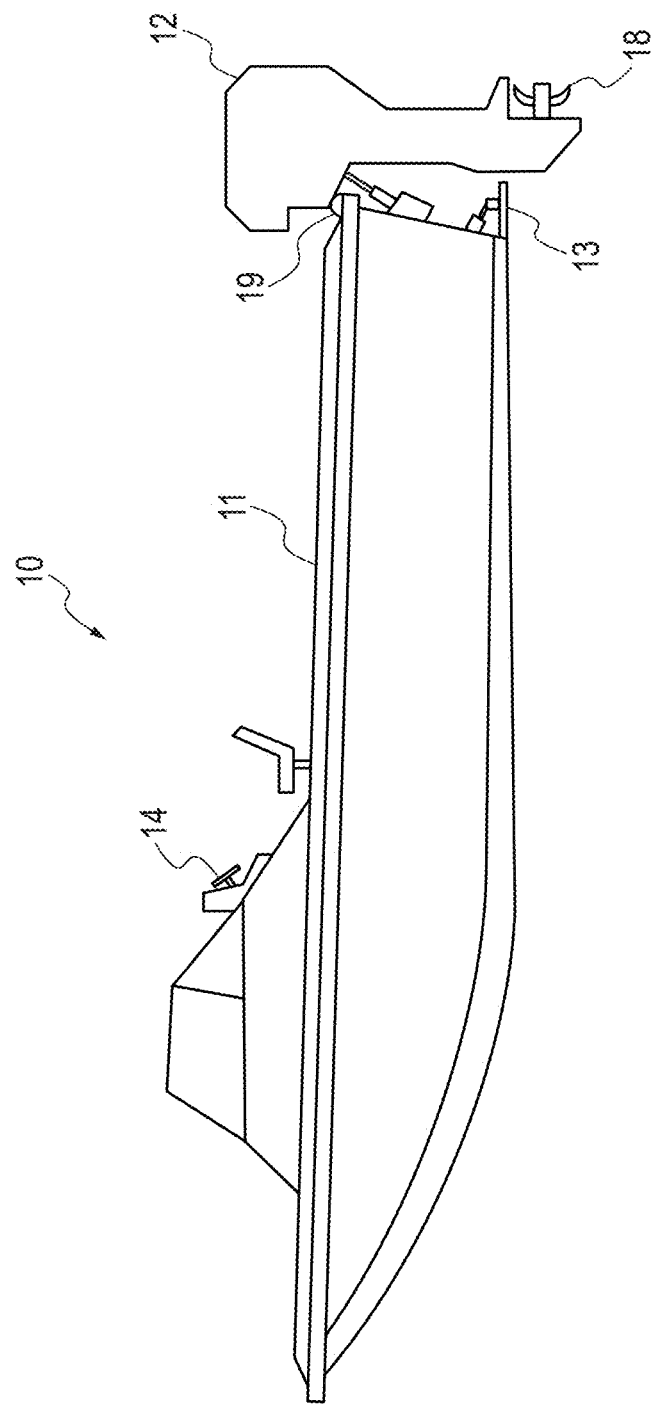
FIG. 1 is a side view of a marine vessel to which a drive source switching system for a marine propulsion device according to a preferred embodiment of the present invention is provided.

FIG. 1 is a side view of a marine vessel to which a drive source switching system for a marine propulsion device according to a preferred embodiment of the present invention is provided. This marine vessel 10 is a planing boat, and includes a hull 11, a plurality of outboard motors 12 which define and function as marine propulsion devices mounted on the hull 11, and a plurality of trim tabs 13. A steering wheel 14 and a remote controller 15 which will be described below are provided in the vicinity of a cockpit in the hull 11.

The outboard motors 12 are mounted on a stern of the hull 11 side by side. Each of the outboard motors 12 includes two drive sources. One is an engine 16 (a second drive source), which is, e.g., an internal combustion engine, and the other is an electric motor 17 (a first drive source). The outboard motors 12 each generates a propulsive force to move the hull 11 by using a propeller 18 (or blades to generate a propulsive force) that is rotatable by a driving force generated by the engine 16 or the electric motor 17.

Each of the outboard motors 12 is mounted on the hull 11 via a mounting unit 19 such that it is able to turn about a vertical or substantially vertical steering axis in the mounting unit 19 in response to a vessel operator's operation of the steering wheel 14. With the outboard motors 12 turning in response to the operation of the steering wheel 14, the marine vessel 10 is steered. Trim tabs 13 are mounted on the stern on the port side and the starboard side such that they are able to swing about a horizontal or substantially horizontal swing axis in the stern. The trim tabs 13 swinging about the swing axis adjust the lift generated at the stern of the hull 11 to control the posture of the hull 11.

Figure 2:
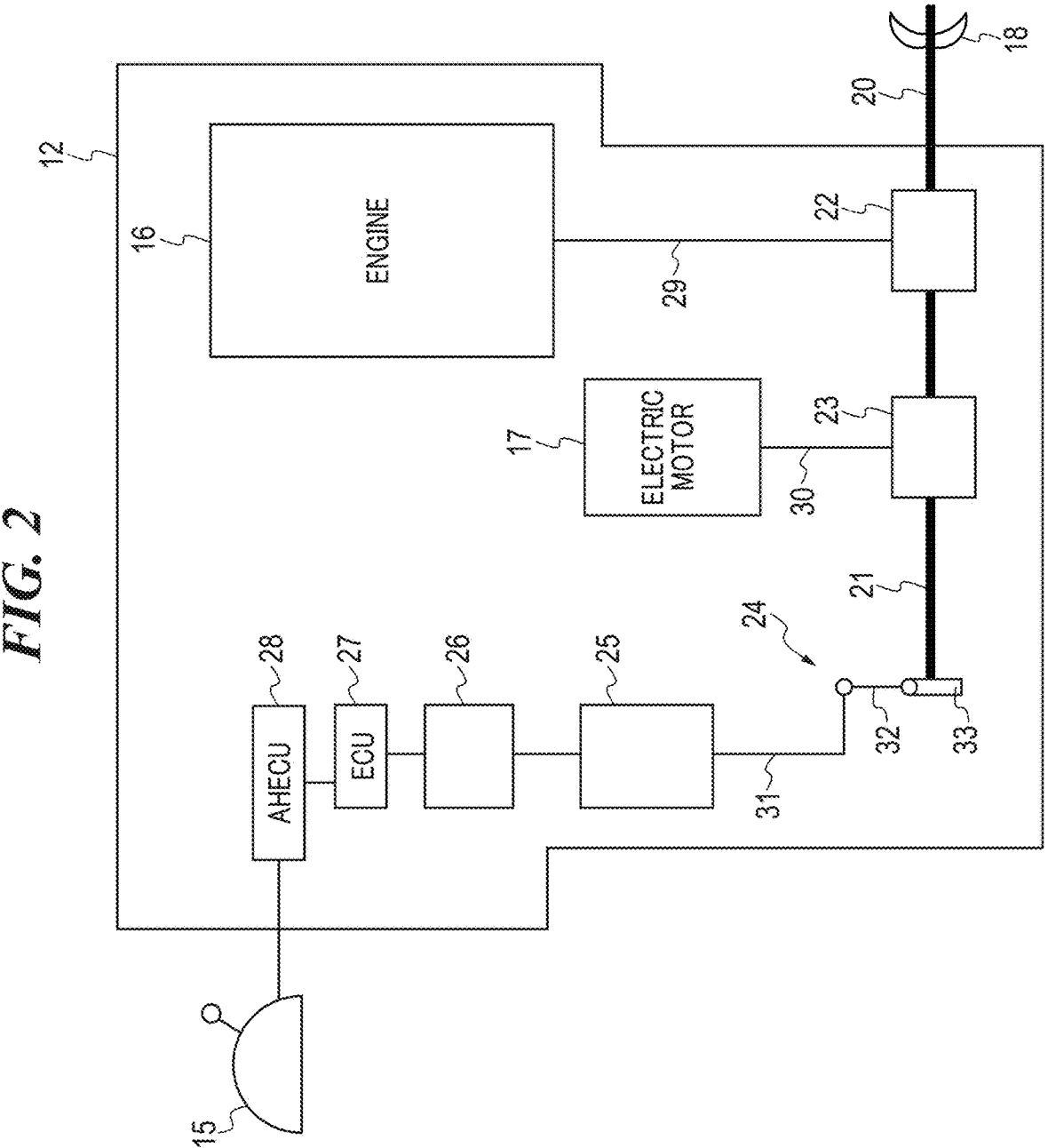
FIG. 2 is a diagram schematically illustrating a configuration of an outboard motor in FIG. 1.

FIG. 2 is a diagram schematically illustrating the configuration of one of the outboard motors 12 in FIG. 1. The diagram mainly illustrates the engine 16, the electric motor 17 and the control system to switch the drive sources of the outboard motor 12 for explanation purposes, and the control systems to control drive forces generated by the drive sources are omitted.

The outboard motor 12 includes the engine 16, the electric motor 17, and a propeller shaft 20. The propeller 18 is connected to the propeller shaft 20, and the propeller shaft 20 rotates the propeller 18 to generate a propulsive force. The outboard motor 12 further includes a shaft-shaped shift slider 21 (first driven member) coupled to the propeller shaft 20. The shift slider 21 is not necessarily coaxial with the propeller shaft 20. The shift slider 21 is only required to be located at a position movable by a shift link mechanism 24 along the rotation axis of the propeller shaft 20.

The outboard motor 12 further includes an engine-side clutch mechanism 22 and an electric motor-side clutch mechanism 23 that define a drive source switching mechanism. The engine-side clutch mechanism 22 switches transmission and non-transmission of the drive force from the engine 16 to the propeller shaft 20. The electric motor-side clutch mechanism 23 switches transmission and non-transmission of the drive force from the electric motor 17 to the shift slider 21. The outboard motor 12 further includes the shift link mechanism 24 (movement mechanism), an actuator 25 that moves the shift link mechanism 24, and an actuator motor 26 which is, e.g., an electric motor that operates the actuator 25. The shift link mechanism 24 is driven by the electric motor and moves the shift slider 21 or a dog clutch 39 which will be described below, in the axial direction of the propeller shaft 20. In the present preferred embodiment, the axial direction of the shift slider 21 and the propeller shaft 20 will hereinafter be referred to simply as "axially" or "the axial direction".

The outboard motor 12 further includes an ECU 27 that transmits a drive signal (shift actuator drive signal) to the actuator motor 26, and an actuator head (AH) ECU 28 (controller) that requests the ECU 27 to switch the drive forces in response to an input from the remote controller 15. The engine 16 and the engine-side clutch mechanism 22 are connected by an engine drive shaft 29, and the electric motor 17 and the electric motor-side clutch mechanism 23 are connected by a motor drive shaft 30.

In the shift link mechanism 24, the actuator 25 moves up and down a shift rod 31 that is connected to one end of an L-shaped link arm 32, and a tip of the shift slider 21 is connected to the other end of the link arm 32 via a pusher 33. The link arm 32 moves the shift slider 21 in the axial direction by converting the up and down movement of the shift rod 31 into the back and forth movement of the pusher 33. Thus, the shift slider 21 moves in the axial direction of the shift slider 21 (and the propeller shaft 20) and is engageable with a motor driven gear 35 which will be described below. It should be noted that the actuator 25 may move the shift rod 31 up and down by using hydraulic pressure generated by the operation of the actuator motor 26, or mechanically convert the rotation of the actuator motor 26 to the up and down movement of the shift rod 31 by a ball screw, for example.

The AHECU 28 controls the movement of the shift slider 21, and preferably further controls the movement of a forward-side driven gear 37 and a reverse-side driven gear 38 described below, to control the switching between the engine 16 and the electric motor 17 by the engine-side clutch mechanism 22 and the electric motor-side clutch mechanism 23.

Figure 3:
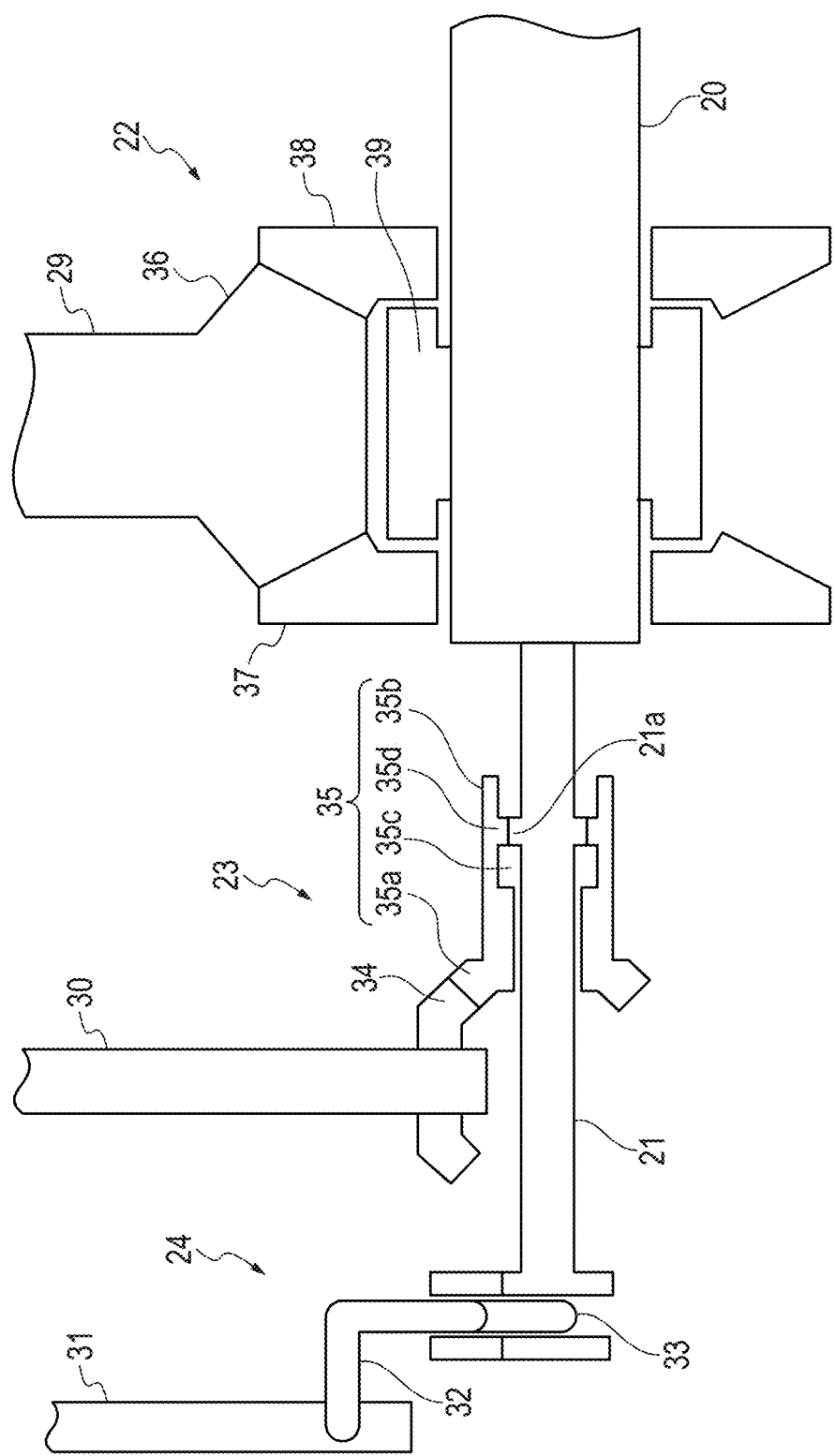
FIG. 3 is a view for explaining the outboard motor of which the shift state is in a neutral state.
Figure 4:
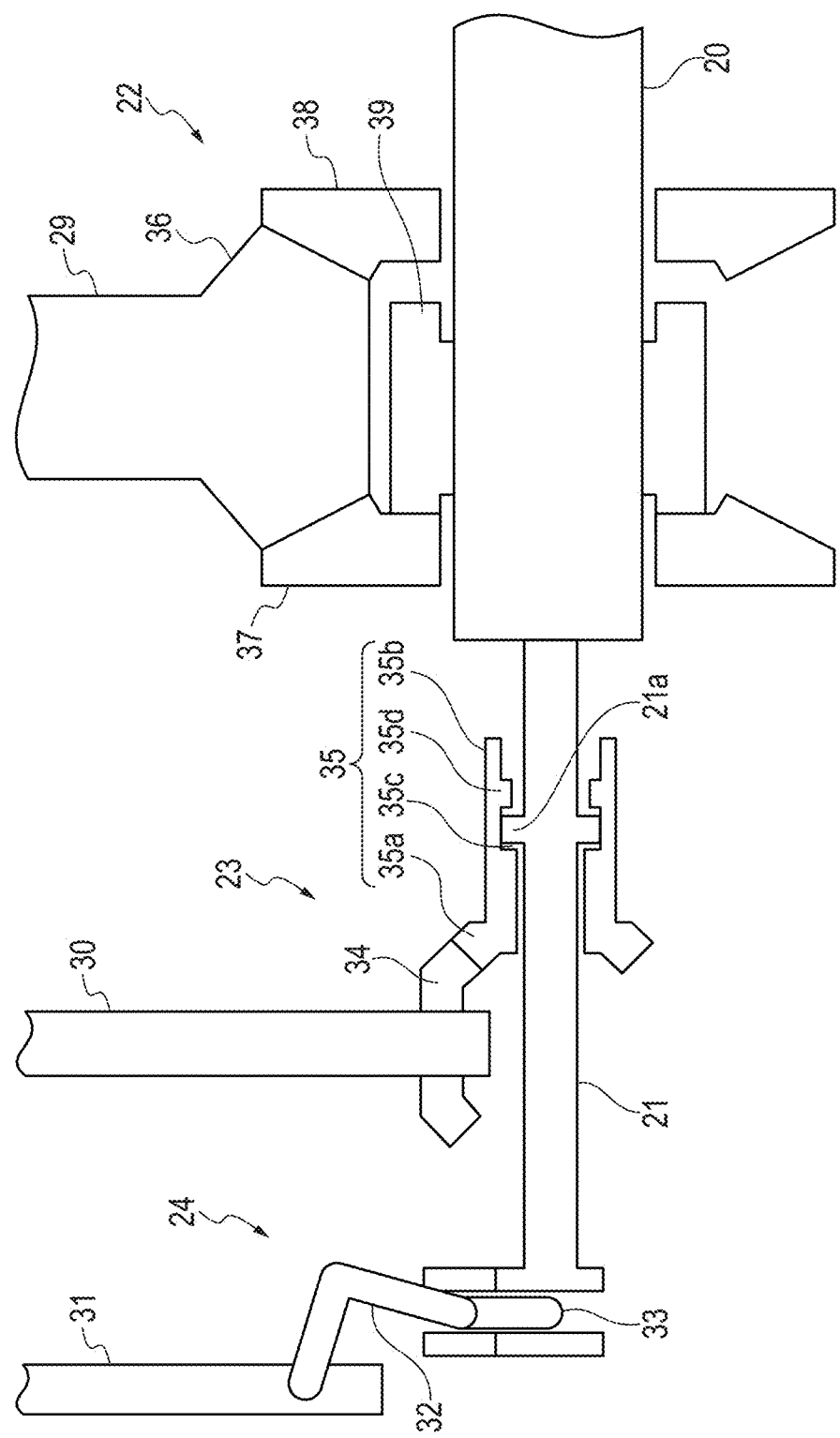
FIG. 4 is a view for explaining the outboard motor of which the shift state is in a forward state.
Figure 5:
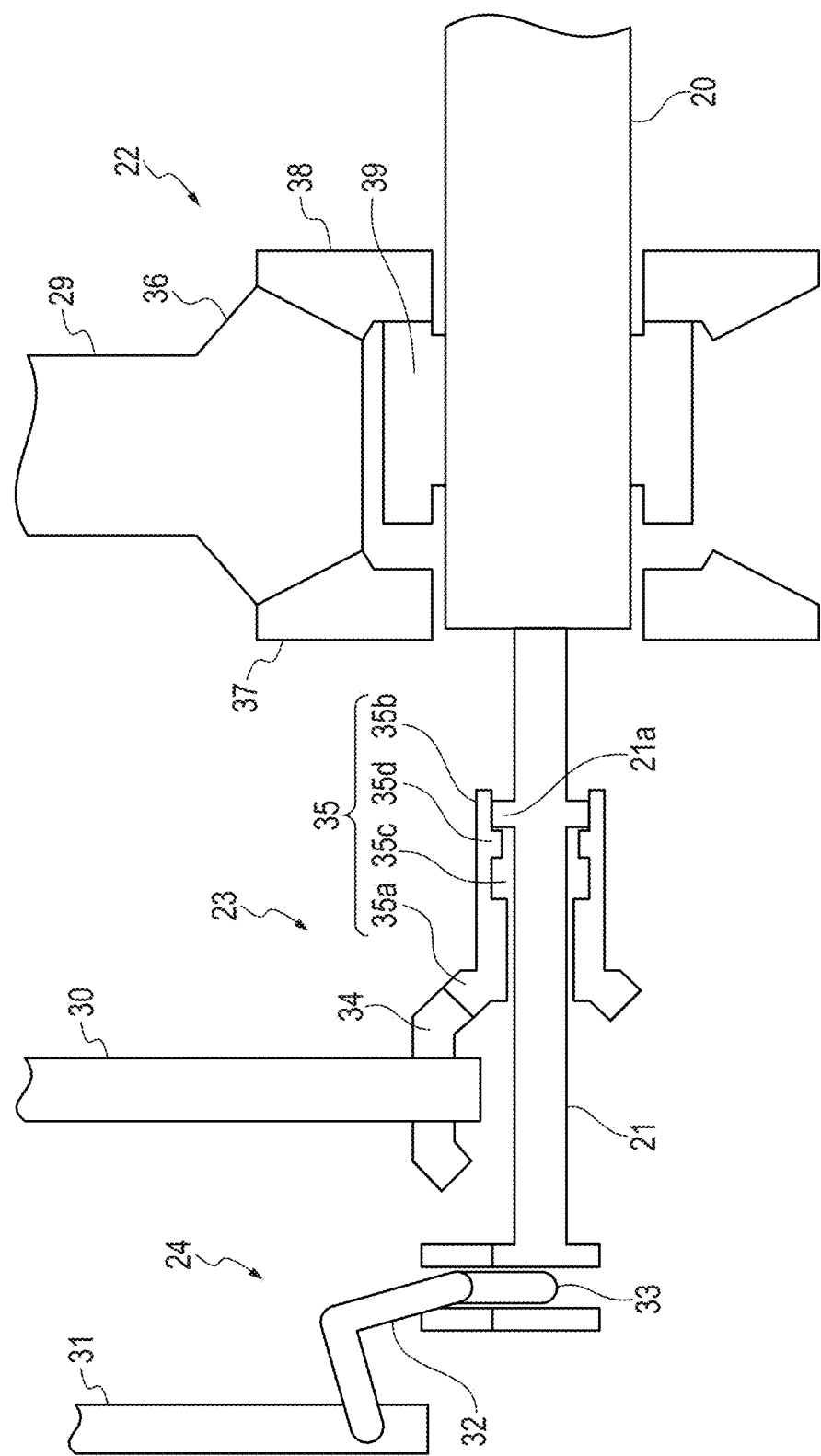
FIG. 5 is a view for explaining the outboard motor of which the shift state is in a reverse state.

FIGS. 3 to 5 are enlarged partial views for explaining the configurations of the engine-side clutch mechanism 22, the electric motor-side clutch mechanism 23, and the shift link mechanism 24 illustrated in FIG. 2.

The electric motor-side clutch mechanism 23 includes a motor drive gear 34, a motor driven gear 35 (first driving member), and a plurality of protrusive engaged teeth 21a. The motor drive gear 34 is a bevel gear that is fixed to the lower end of the motor drive shaft 30 in the figure and is rotatable together with the motor drive shaft 30. The motor driven gear 35 (first driving member) is located so as to cover the shift slider 21. The protrusive engaged teeth 21a are located at equal intervals along the outer periphery of the shift slider 21. The motor driven gear 35 transmits the drive force generated by the electric motor 17, and includes a bevel gear portion 35a and a cylindrical or substantially cylindrical body 35b. The body 35b includes a space 35c to accommodate the engaged teeth 21a of the shift slider 21 and extending in the axial direction so that the engaged teeth 21a are able to move in the axial direction. A plurality of engaging teeth 35d project from the inner peripheral surface of the body 35b toward the space 35c. The engaging teeth 35d are located at equal intervals along the inner periphery of the body 35b.

In the electric motor-side clutch mechanism 23, the motor drive gear 34 and the bevel gear portion 35a of the motor driven gear 35 are always engaged with each other, and the motor driven gear 35 is rotationally driven about the axis of a shift slider 21 by the motor drive gear 34. That is, the shift slider 21 and the motor driven gear 35 rotate about the axis of the propeller shaft 20, and, when engaged with the motor driven gear 35, the shift slider 21 transmits the drive force generated by the electric motor 17 to the propeller shaft 20.

The engine-side clutch mechanism 22 includes an engine drive gear 36, the forward-side driven gear 37 (second driving member), the reverse-side driven gear 38 (second driving member), and the cylindrical dog clutch 39 (second driven member). The engine drive gear 36 is a bevel gear that is fixed to the lower end of the engine drive shaft 29 in the figure and is rotatable together with the engine drive shaft 29. The forward-side driven gear 37 (second driving member) is a bevel gear that is located so as to cover the propeller shaft 20 and transmits the drive force generated by the engine 16. The reverse-side driven gear 38 (second driving member) is a bevel gear located so as to face the forward-side driven gear 37. The cylindrical dog clutch 39 (second driven member) is located between the forward-side driven gear 37 and the reverse-side driven gear 38.

The dog clutch 39 is a sleeve-shaped member located so as to cover the propeller shaft 20. A plurality of axially extending grooves are provided on the inner peripheral surface of the dog clutch 39, and the grooves are engaged with a plurality of axially extending protrusions projecting from the outer periphery of the propeller shaft 20. This allows the dog clutch 39 to rotate together with the propeller shaft 20 and move axially relative to the propeller shaft 20. Thus, the dog clutch 39 is movable in the axial direction of the propeller shaft 20 and is engageable with the forward-side driven gear 37 and the reverse-side driven gear 38, and, when engaged with the forward-side driven gear 37 or the reverse-side driven gear 38, transmits the drive force generated by the engine 16 to the propeller shaft 20. The forward-side driven gear 37 is provided with a plurality of teeth on a surface facing the dog clutch 39, and the dog clutch 39 is provided with a plurality of teeth on an end (front end) facing the forward-side driven gear 37. The reverse-side driven gear 38 is provided with a plurality of teeth on a surface facing the dog clutch 39, and the dog clutch 39 is provided with a plurality of teeth on an end (rear end) facing the reverse-side driven gear 38. Together with the shift slider 21, the dog clutch 39 is movable in the axial direction by the shift link mechanism 24 via a mechanism that is not shown.

In the engine-side clutch mechanism 22, both of the forward-side driven gear 37 and the reverse-side driven gear 38 are always engaged with the engine drive gear 36 and are rotationally driven on the axis of the propeller shaft 20 by the engine drive gear 36. However, since the forward-side driven gear 37 and the reverse-side driven gear 38 face each other so as to sandwich the engine drive gear 36 therebetween, the forward-side driven gear 37 and the reverse-side driven gear 38 rotate in opposite directions to each other.

In the above configuration, the forward-side driven gear 37 and the reverse-side driven gear 38 are not engaged with the dog clutch 39 when the motor driven gear 35 and the shift slider 21 are engaged with each other, and the motor driven gear 35 and the shift slider 21 are not engaged with each other when the forward-side driven gear 37 and the reverse-side driven gear 38 are engaged with the dog clutch 39.

FIG. 3 illustrates the outboard motor 12 of which the shift state (i.e., state of the gears) is in the neutral state. In the neutral state, the drive force generated by the engine 16 is not transmitted to the propeller 18 and the drive force generated by the electric motor 17 is transmitted to the propeller 18.

In the neutral state, the shift rod 31 of the shift link mechanism 24 is positioned at an intermediate position that falls within a range in which the shift rod 31 is movable upward and downward. It brings the shift slider 21 and the dog clutch 39 to an intermediate position that falls within a range in which the shift slider 21 and the dog clutch 39 are movable in the axial direction so that the engaged teeth 21a of the shift slider 21 are engaged with the respective engaging teeth 35d of the motor driven gear 35 and the dog clutch 39 is engaged with neither the forward-side driven gear 37 nor the reverse-side driven gear 38.

In this arrangement, the drive force generated by the electric motor 17 is transmitted via the motor drive shaft 30, the motor drive gear 34, and the motor driven gear 35 to the shift slider 21 and then to the propeller shaft 20 to rotate the propeller 18. The rotation direction of the electric motor 17 is controlled by changing the pole of the current supplied to the electric motor 17, and thus the marine vessel 10 is movable forward and backward in the neutral state.

FIG. 4 illustrates the outboard motor 12 of which the shift state is in the forward state. In the forward state, the drive force generated by the electric motor 17 is not transmitted to the propeller 18 and the drive force from the engine 16 is transmitted to the propeller 18.

In the forward state, the shift rod 31 of the shift link mechanism 24 moves upward, and it moves the shift slider 21 and the dog clutch 39 axially forward (left direction in the figure) so that the engaged teeth 21a of the shift slider 21 are not engaged with the respective engaging teeth 35d of the motor driven gear 35, and the teeth at the front end of the dog clutch 39 are engaged with the respective teeth on the facing surface of the forward-side driven gear 37. After this movement, the engaged teeth 21a are positioned axially forward of the respective engaging teeth 35d.

In this arrangement, the drive force generated by the engine 16 is transmitted to the propeller shaft 20 via the engine drive shaft 29, the engine drive gear 36, the forward-side driven gear 37, and the dog clutch 39 to rotate the propeller 18 forward. In the forward state, the propeller 18 rotates forward to move the marine vessel 10 forward.

FIG. 5 illustrates the outboard motor 12 of which the shift state is in the reverse state. In the reverse state, the drive force generated by the electric motor 17 is not transmitted to the propeller 18 and the drive force from the engine 16 is transmitted to the propeller 18.

In the reverse state, the shift rod 31 of the shift link mechanism 24 moves downward, and it moves the shift slider 21 and the dog clutch 39 axially rearward (right direction in the figure) so that the engaged teeth 21a of the shift slider 21 are not engaged with the respective engaging teeth 35d of the motor driven gear 35, and the teeth at the rear end of the dog clutch 39 are engaged with the respective teeth on the facing surface of the reverse-side driven gear 38. After this movement, the engaged teeth 21a are positioned axially rearward of the respective engaging teeth 35d.

In this arrangement, the drive force generated by the engine 16 is transmitted to the propeller shaft 20 via the engine drive shaft 29, the engine drive gear 36, the reverse-side driven gear 38, and the dog clutch 39 to rotate the propeller 18 reversely. In the reverse state, the propeller 18 rotates reversely to move the marine vessel 10 reversely.

FIG. 6 is a diagram explaining signal transmission in a control system to switch drive sources of the outboard motor 12. The remote controller 15 transmits to the AHECU 28, in response to an operation on an operation lever 15b by a vessel operator, a shift request that gives an instruction to switch the shift state of the outboard motor 12 to any of the neutral state, the forward state, and the reverse state. The remote controller 15 outputs a shift amount of 0% as a shift request in a case of switching the shift state of the outboard motor 12 to the neutral state, outputs a shift amount of 100% as a shift request in a case of switching the shift state of the outboard motor 12 to the forward state, and outputs a shift amount of −100% as a shift request in a case of switching the shift state of the outboard motor 12 to the reverse state. The AHECU 28 having received a shift request transfers the shift request to the ECU 27. The ECU 27 having received the shift request transmits to the actuator motor 26 a shift actuator drive signal requesting a drive amount of the actuator motor 26 corresponding to the shift amount indicated by the shift request. The actuator motor 26 having received the shift actuator drive signal operates the actuator 25 in accordance with the requested drive amount.

The actuator 25 includes a shift position sensor (which is not shown), and the shift position sensor detects the position of the shift rod 31 and transmits the detected position as shift position information to the ECU 27 via the actuator motor 26. The actuator 25 outputs the shift amount of 0% as shift position information in a case that the shift state of the outboard motor 12 is switched to the neutral state, outputs the shift amount of 100% as shift position information in a case that the shift state of the outboard motor 12 is switched to the forward state, and outputs the shift amount of −100% as shift position information in a case that the shift state of the outboard motor 12 is switched to the reverse state.

The ECU 27 having received shift position information transfers the shift position information to the AHECU 28. The AHECU 28 having received the shift position information determines whether or not the shift amount of the shift position information and the shift amount of the shift request match each other.

The remote controller 15 includes a semi-cylindrical body 15a and the operation lever 15b movable along the outer periphery of the body 15a, and a plurality of throttle positions of Fmax, F2, F1, N, R1, R2, and Rmax are set clockwise along the circumferential direction of the body 15a. The remote controller 15 includes a built-in mechanism that generates a clicking feeling at each throttle position when the operation lever 15b is moved along the outer periphery of the body 15a, and facilitates the movement of the operation lever 15b to a desired throttle position when the vessel operator operates the operation lever 15b.

Fmax is the maximum power position at which the forward propulsion force of the marine vessel 10 by the propeller 18 becomes maximum. Rmax is the maximum power position at which the rearward propulsion force of the marine vessel 10 by the propeller 18 becomes maximum. N is the origin position at which the outboard motor 12 generates no propulsion force. In the remote controller 15, the region from N to Fmax is a forward region where the outboard motor 12 propels the marine vessel 10 forward, and the region from N to Rmax is a reverse region where the outboard motor 12 propels the marine vessel 10 rearward.

The operation lever 15b operated by the vessel operator moves from N to Fmax through F1 and F2 in this order. The region from N to F1 is an electric motor forward region where the electric motor 17 alone rotates the propeller 18 forward, and in this region, the shift state of the outboard motor 12 becomes the neutral state. The region from F1 to F2 is a region where the shift state of the outboard motor 12 is switched from the neutral state to the forward state. The region from F2 to Fmax is an engine forward region where the engine 16 alone rotates the propeller 18 forward, and in this region, the shift state of the outboard motor 12 becomes the forward state. It should be noted that F1 and F2 may be combined into one throttle position, and when the operation lever 15b moves to the throttle position, the shift state of the outboard motor 12 may be switched from the neutral state to the forward state.

Similarly, the operation lever 15b moves from N to Rmax through R1 and R2 in this order. The region from N to R1 is an electric motor reverse region where the electric motor 17 alone rotates the propeller 18 reversely, and also in this region, the shift state of the outboard motor 12 becomes the neutral state. The region from R1 to R2 is a region where the shift state of the outboard motor 12 is switched from the neutral state to the reverse state. The region from R2 to Rmax is an engine reverse region where the engine 16 alone rotates the propeller 18 reversely, and also in this region, the shift state of the outboard motor 12 becomes the reverse state. It should be noted that R1 and R2 may be combined into one throttle position, and when the operation lever 15b moves to the throttle position, the shift state of the outboard motor 12 may be switched from the neutral state to the reverse state.

Figure 7A:
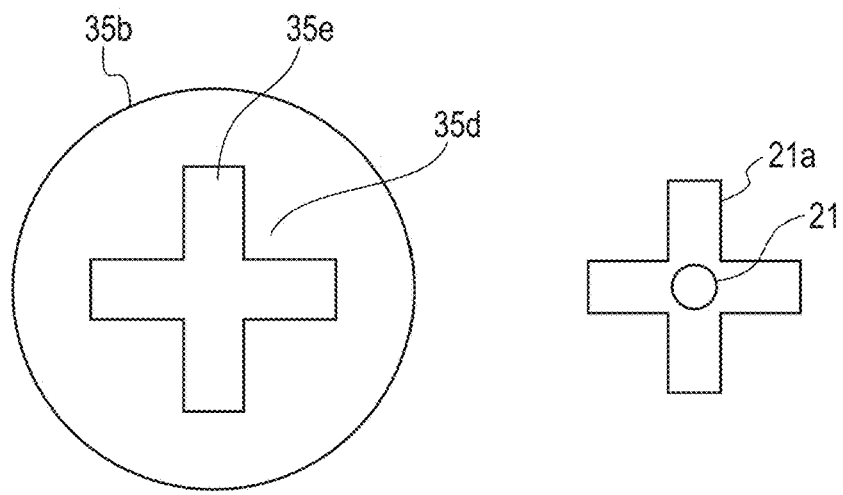
FIGS. 7A to 7C are views explaining the workings of the outboard motor to switch its shift state from the forward state or the reverse state to the neutral state.
Figure 7B:
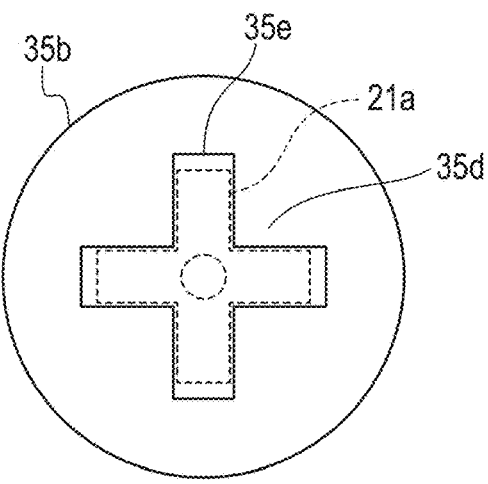
Figure 7C:
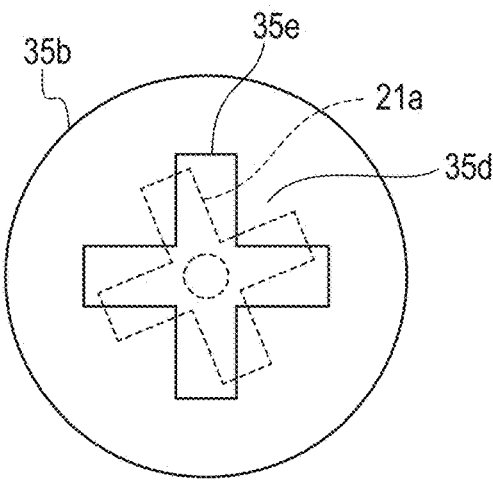

When switching the shift state of the outboard motor 12, the shift state is sometimes not smoothly switched. FIGS. 7A to 7C are views explaining the workings of the outboard motor 12 to switch its shift state from the forward state or the reverse state to the neutral state, and each illustrates cross sections of the motor driven gear 35 and the shift slider 21. Referring to FIGS. 7A to 7C, a description is given of a situation that the shift state is not smoothly switched. In FIGS. 7A to 7C, for easy understanding, the engaging teeth 35d of the motor driven gear 35 and the engaged teeth 21a of the shift slider 21 are drawn largely in an exaggerated manner.

As illustrated in FIG. 7A, for example, four engaging teeth 35d project toward the space 35c of the body 35b of the motor driven gear 35, and, for example, four engaged teeth 21a project from the periphery of the shift slider 21. In the motor driven gear 35 and the shift slider 21 having such configurations, in order to switch the shift state of the outboard motor 12 from the forward state or the reverse state to the neutral state, as illustrated in FIG. 7B, it is necessary for the engaged teeth 21a to enter the respective engaging grooves 35e provided between two adjacent engaging teeth 35d. In FIG. 7B and FIG. 7C described below, the shift slider 21 and the engaged teeth 21a are indicated by broken lines.

However, as illustrated in FIG. 7C, in a case that the positions of the engaged teeth 21a and the respective engaging grooves 35e are out of alignment, the engaged teeth 21a cannot enter the respective engaging grooves 35e, and the shift state is not smoothly switched from the forward state or the reverse state to the neutral state. In this situation, the engaged teeth 21a and the engaging teeth 35d may collide with each other and make abnormal noise. Further, the shift link mechanism 24 attempting to continue the axial movement of the shift slider 21 may apply a large load to the actuator motor 26 as a result of the attempt.

In a case of switching the shift state of the outboard motor 12 from the neutral state to the forward state or the reverse state, there may be a situation that the teeth of the front end of the dog clutch 39 and the respective grooves provided between teeth of the facing surface of the forward-side driven gear 37 are out of alignment, and a situation that the teeth of the rear end of the dog clutch 39 and the respective grooves provided between teeth of the facing surface of the reverse-side driven gear 38 are out of alignment. In these situations, it is similarly impossible to smoothly switch the shift state from the neutral state to the forward state or the reverse state.

In the present preferred embodiment, to solve this issue, the switching of the shift state is temporarily interrupted in a case that the shift state is not smoothly switched. That is, in a case of failure to switch the drive source to be used between the engine 16 and the electric motor 17, the AHECU 28 temporarily interrupts the switching between the drive sources. After having temporarily interrupted the switching between the drive sources, the AHECU 28 may attempt the switching between the drive sources again.

Specifically, in a case that the AHECU 28 moves the shift slider 21 from a predetermined position (first position) where the shift slider 21 is not engaged with the motor driven gear 35, in the axial direction of the propeller shaft 20 toward the motor driven gear 35, the AHECU 28 moves back the shift slider 21 in the direction toward the first position when the shift slider 21 fails to engage with the motor driven gear 35. In another case that the AHECU 28 moves the dog clutch 39 from another predetermined position (second position) where the dog clutch 39 is not engaged with the forward-side driven gear 37 or the reverse-side driven gear 38, in the axial direction of the propeller shaft 20 toward the forward-side driven gear 37 or the reverse-side driven gear 38, the AHECU 28 moves back the dog clutch 39 in the direction toward the second position when the dog clutch 39 fails to engage with the forward-side driven gear 37 or the reverse-side driven gear 38.

In another case that the AHECU 28 moves the shift slider 21 that is not engaged with the motor driven gear 35, in the axial direction of the propeller shaft 20 from the first position toward the first driving member, the AHECU 28 controls the electric motor 17 to bring the number or revolutions (hereinafter, referred to as a rotation speed) of the motor driven gear 35 close to the rotation speed of the shift slider 21. In the case that the AHECU 28 moves the shift slider 21 that is not engaged with the motor driven gear 35, in the axial direction of the propeller shaft 20 from the first position toward the first driving member, the engine 16 may rotate the shift slider 21 via the forward-side driven gear 37, the reverse-side driven gear 38, the dog clutch 39, and the propeller shaft 20, and the engine 16 may be brought into an idle state.

Figure 8:
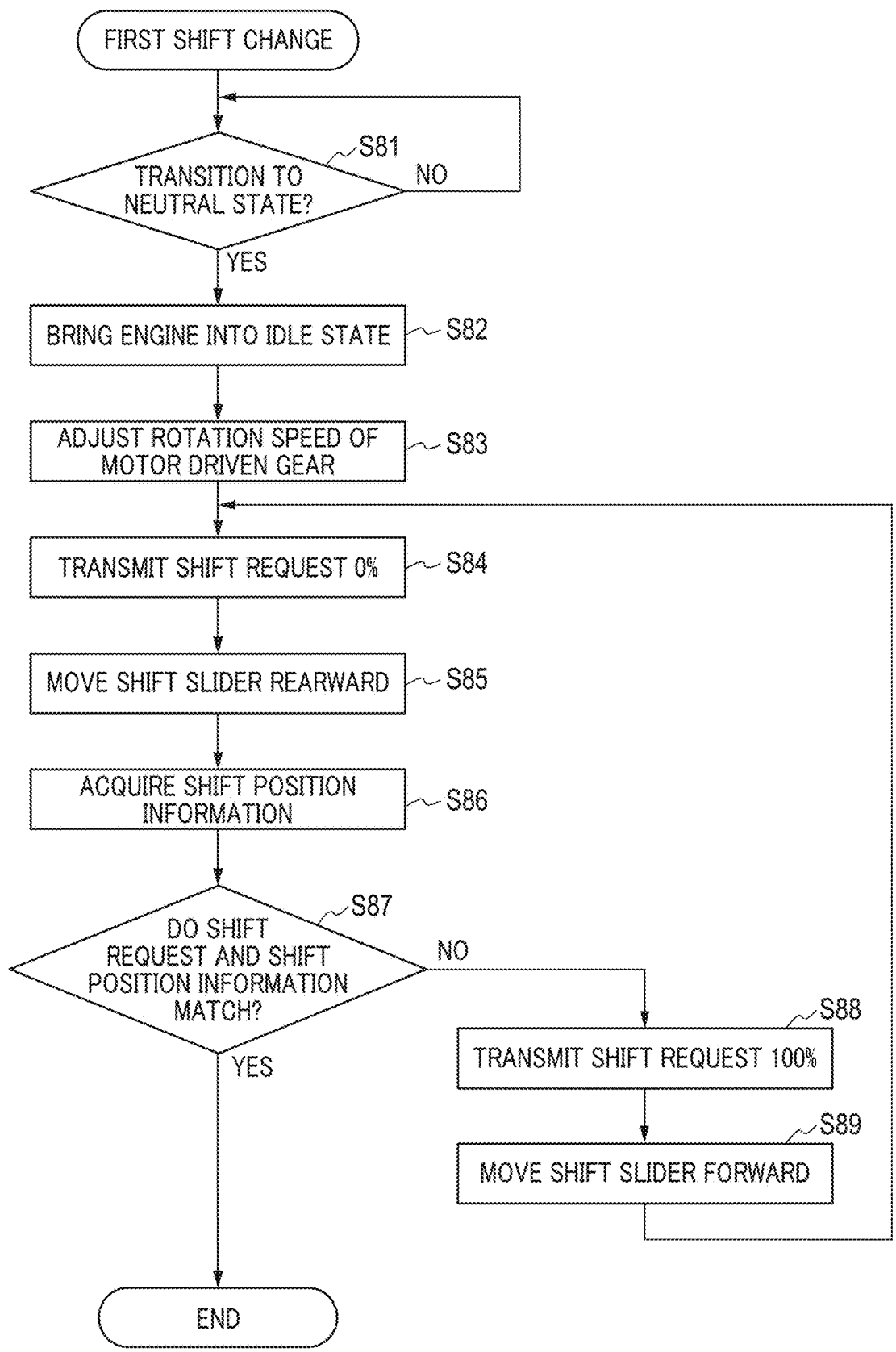
FIG. 8 is a flowchart illustrating a first shift change process.

FIG. 8 is a flowchart of the first shift change process using a method of switching the drive sources of the marine propulsion device according to the present preferred embodiment. The process illustrated in FIG. 8 is carried out by the AHECU 28 executing a control program stored in advance in a memory or a non-transitory computer readable medium (which is not shown) when switching the shift state of the outboard motor 12 from the forward state to the neutral state.

In the flowchart of FIG. 8, in response to the vessel operator operating the operation lever 15b of the remote controller 15, the AHECU 28 determines whether or not the operation lever 15b has been moved from F2 to F1 to request a transition of the shift state of the outboard motor 12 from the forward state to the neutral state (Step S81).

In step S81, if the transition from the forward state to the neutral state is not requested, the process returns to step S81, and the AHECU 28 continues the determination. If the transition from the forward state to the neutral state is requested, the AHECU 28 first brings the engine 16 into the idle state (Step S82). At this time, as described above, the remote controller 15 transmits a shift amount of 0% as a shift request to the AHECU 28. Thereafter, the AHECU 28 uses the electric motor 17 to adjust the rotation speed of the motor driven gear 35 rotated by the electric motor 17 so as to substantially match the rotation speed of the shift slider 21 rotated by the engine 16 via the engine-side clutch mechanism 22 and the propeller shaft 20 (Step S83). However, at this time, the AHECU 28 brings the rotation speed of the motor driven gear 35 close to the rotation speed of the shift slider 21, but does not cause the rotation speed of the motor driven gear 35 to completely match the rotation speed of the shift slider 21.

Subsequently, the AHECU 28 transmits, to the ECU 27 the shift request (shift amount of 0%) transmitted from the remote controller 15 (Step S84), and the ECU 27 causes the shift link mechanism 24 to move the shift slider 21 axially rearward (Step S85). At this time, the shift state of the outboard motor 12 attempts to change from the forward state illustrated in FIG. 4 to the neutral state illustrated in FIG. 3.

Thereafter, the ECU 27 acquires shift position information indicating the position of the shift rod 31 detected by the actuator 25 (Step S86). As for the shift position information, the actuator 25 outputs the shift amount of 0% in a case that the shift state of the outboard motor 12 is successfully switched to the neutral state, and outputs the shift amount of 50% in a case that the engaged teeth 21a of the shift slider 21 fail to enter the respective engaging grooves 35e of the motor driven gear 35 and the shift state of the outboard motor 12 is not switched to the neutral state, as described in FIGS. 7A to 7C. In a case that the shift state of the outboard motor 12 is not switched to the neutral state, the actuator 25 may output any of the following as the shift position information, rather than outputting uniformly the shift amount of 50% as the shift position information. For example, the actuator 25 may output the progress rate corresponding to the actual operation amount of the actuator 25, the actual movement amount of the shift rod 31, or the actual movement amount of the shift slider 21 (e.g., 25% as a progress rate when the actuator 25 is operated only 25% of the rated operation amount).

The ECU 27 then transfers the acquired shift position information to the AHECU 28, and the AHECU 28 having received the shift position information determines whether or not the shift amount of the shift request matches the shift amount of the shift position information (Step S87).

In step S87, if the shift amount of the shift request and the shift amount of the shift position information are both 0% and thus match each other, the AHECU 28 ends the present process on an assumption that the shift state of the outboard motor 12 has been switched to the neutral state. On the other hand, if the shift amount of the shift position information is not 0% and the shift amount of the shift request and the shift amount of the shift position information do not match each other, the AHECU 28 transmits a shift amount of 100% as a shift request to the ECU 27 on an assumption that the shift state of the outboard motor 12 has not successfully switched to the neutral state (Step S88).

Next, the ECU 27 having received the shift request (shift amount of 100%) uses the shift link mechanism 24 to temporarily interrupt the axially rearward movement of the shift slider 21 and move the shift slider 21 axially forward (Step S89). At this time, the shift state of the outboard motor 12 returns to the forward state illustrated in FIG. 4, and the shift slider 21 (in particular, the engaged teeth 21a) moves back in the direction of the movement start position (first position) at which the movement is started in step S85. That is, the switching of the shift state of the outboard motor 12 from the forward state to the neutral state is temporarily interrupted. At this time, it is not necessary for the shift slider 21 to completely return to the movement start position, and it is sufficient for the shift slider 21 to return to at least the position where the engaged teeth 21a are separated from the engaging teeth 35d of the motor driven gear 35.

After step S89, the process returns to step S84, in which the AHECU 28 transmits, to the ECU 27, the shift request (shift amount of 0%) having been transmitted from the remote controller 15, and moves the shift slider 21 axially rearward again to attempt to switch the shift state of the outboard motor 12 from the forward state to the neutral state. That is, the series of processes in the steps S84, S85, S86, S87 (NO), S88, and S89 is repeated unless the shift state of the outboard motor 12 is successfully switched to the neutral state. Here, as described above, the rotation speed of the motor driven gear 35 and the rotation speed of the shift slider 21 do not completely match each other, which changes the relative position between the engaged tooth 21a and the corresponding engaging groove 35e with the lapse of time. Accordingly, when the ECU 27 moves the shift slider 21 axially rearward again, the engaged teeth 21a are able to smoothly enter the respective engaging grooves 35e eventually. Therefore, by repeating the series of processes in steps S84, S85, S86, S87 (NO), S88, and S89, the engaged teeth 21a are able to smoothly enter the corresponding engaging grooves 35e, and as a result, the AHECU 28 smoothly switches the shift state of the outboard motor 12 from the forward state to the neutral state.

It should be noted that if the series of processes in steps S84, S85, S86, S87 (NO), S88, and S89 is repeated many times, it is also conceivable that a load is applied to the actuator motor 26, a harness connected to the actuator motor 26 generates heat, the generated heat amount exceeds the allowable heat amount of the harness, and a fuse, the harness, and the like are blown. Therefore, the process may return to step S84 after a certain period of delay time has elapsed after step S89 (i.e., the AHECU 28 may cause the shift slider 21 to move toward the motor driven gear 35 again after a certain period of delay time has elapsed), so as to intentionally change the relative position between the engaged teeth 21a and the respective engaging grooves 35e at a time when the shift slider 21 meets the motor driven gear 35 and thus increase the possibility that the engaged teeth 21a smoothly enter the respective engaging grooves 35e. With this process, it is expected to reduce the number of repetitions of the series of processes described above, and it is thus possible to significantly reduce or prevent the harness from generating heat.

Figure 9:
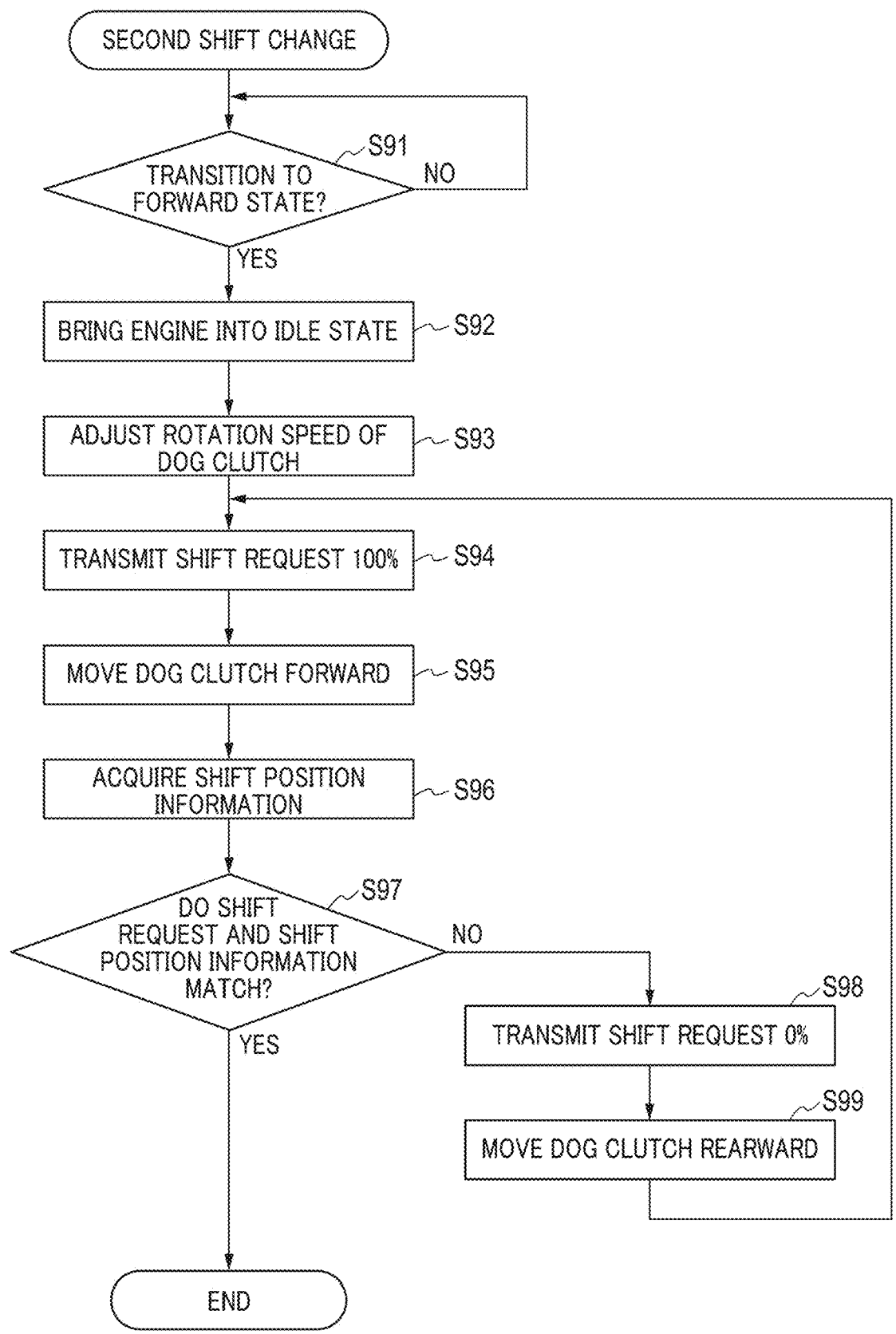
FIG. 9 is a flowchart illustrating a second shift change process.

FIG. 9 is a flowchart of the second shift change process using a method of switching the drive sources of the marine propulsion device according to the present preferred embodiment. The process illustrated in FIG. 9 is carried out by the AHECU 28 executing a control program stored in advance in a memory or a non-transitory computer readable medium (which is not shown) when switching the shift state of the outboard motor 12 from the neutral state to the forward state.

In the flowchart of FIG. 9, in response to the vessel operator operating the operation lever 15b of the remote controller 15, the AHECU 28 determines whether or not the operation lever 15b has been moved from F1 to F2 to request a transition of the shift state of the outboard motor 12 from the neutral state to the forward state (Step S91).

In step S91, if the transition from the neutral state to the forward state is not requested, the process returns to step S91, and the AHECU 28 continues the determination. If the transition from the neutral state to the forward state is requested, the AHECU 28 first brings the engine 16 into the idle state (Step S92). At this time, as described above, the remote controller 15 transmits a shift amount of 100% as a shift request to the AHECU 28. Thereafter, the AHECU 28 uses the electric motor 17 to adjust the rotation speed of the dog clutch 39 rotated by the electric motor 17 via the electric motor-side clutch mechanism 23, the shift slider 21, and the propeller shaft 20 so as to substantially match the rotation speed of the forward-side driven gear 37 rotated by the engine 16 (Step S93). However, at this time, the AHECU 28 brings the rotation speed of the dog clutch 39 close to the rotation speed of the forward-side driven gear 37, but does not cause the rotation speed of the dog clutch 39 to completely match the rotation speed of the forward-side driven gear 37.

Subsequently, the AHECU 28 transmits, to the ECU 27 the shift request (shift amount of 100%) transmitted from the remote controller 15 (Step S94), and the ECU 27 causes the shift link mechanism 24 to move the dog clutch 39 axially forward (Step S95). At this time, the shift state of the outboard motor 12 attempts to change from the neutral state illustrated in FIG. 3 to the forward state illustrated in FIG. 4.

Thereafter, the ECU 27 acquires shift position information indicating the position of the shift rod 31 detected by the actuator 25 (Step S96). As for the shift position information, the actuator 25 outputs the shift amount of 100% in a case that the shift state of the outboard motor 12 is successfully switched to the forward state, and outputs the shift amount of 50% in a case that the teeth of the front end of the dog clutch 39 fail to enter the respective grooves provided between the teeth of the facing surface of the forward-side driven gear 37 and the shift state of the outboard motor 12 is not switched to the forward state, as described above. In a case that the shift state of the outboard motor 12 is not switched to the forward state, the actuator 25 may output, as the shift position information, the progress rate corresponding to the actual operation amount of the actuator 25, for example.

The ECU 27 then transfers the acquired shift position information to the AHECU 28, and the AHECU 28 having received the shift position information determines whether or not the shift amount of the shift request matches the shift amount of the shift position information (Step S97).

In step S97, if the shift amount of the shift request and the shift amount of the shift position information are both 100% and thus match each other, the AHECU 28 ends the present process on an assumption that the shift state of the outboard motor 12 has been switched to the forward state. On the other hand, if the shift amount of the shift position information is not 100% and the shift amount of the shift request and the shift amount of the shift position information do not match each other, the AHECU 28 transmits a shift amount of 0% as a shift request to the ECU 27 on an assumption that the shift state of the outboard motor 12 has not successfully switched to the forward state (Step S98).

Next, the ECU 27 having received the shift request (shift amount of 0%) uses the shift link mechanism 24 to temporarily interrupt the axially forward movement of the dog clutch 39 and move the dog clutch 39 axially rearward (Step S99). At this time, the shift state of the outboard motor 12 returns to the neutral state illustrated in FIG. 3, and the dog clutch 39 moves back in the direction toward the movement start position (second position) at which the movement is started in step S95. That is, the switching of the shift state of the outboard motor 12 from the neutral state to the forward state is temporarily interrupted. At this time, it is not necessary for the dog clutch 39 to completely return to the movement start position, and it is sufficient for the dog clutch 39 to return to at least the position where the teeth of the front end of the dog clutch 39 is separated from the teeth of the facing surface of the forward-side driven gear 37.

After step S99, the process returns to step S94, in which the AHECU 28 transmits, to the ECU 27, the shift request (shift amount of 100%) having been transmitted from the remote controller 15, and moves the dog clutch 39 axially forward again to attempt to switch the shift state of the outboard motor 12 from the neutral state to the forward state. That is, the series of processes in steps S94, S95, S96, S97 (NO), S98, and S99 is repeated unless the shift state of the outboard motor 12 is successfully switched to the forward state. Here, as described above, the rotation speed of the dog clutch 39 does not completely match the rotation speed of the forward-side driven gear 37, which changes the relative position between the teeth of the front end of the dog clutch 39 and the corresponding grooves provided between the teeth of the facing surface of the forward-side driven gear 37 with the lapse of time. Accordingly, when the ECU 27 moves the dog clutch 39 axially forward again, the teeth of the front end of the dog clutch 39 are able to smoothly enter the respective groove provided between the teeth of the facing surface of the forward-side driven gear 37 eventually. Therefore, by repeating the series of processes in steps S94, S95, S96, S97 (NO), S98, and S99, the teeth at the front end of the dog clutch 39 are able to smoothly enter the respective grooves provided between teeth of the facing surface of the forward-side driven gear 37, and as a result, the AHECU 28 smoothly switches the shift state of the outboard motor 12 from the neutral state to the forward state.

The process may return to step S94 after a certain period of delay time has elapsed after step S99 (i.e., the AHECU 28 may cause the dog clutch 39 to move toward the forward-side driven gear 37 again after a certain period of delay time has elapsed), so as to intentionally change the relative position between the teeth of the front end of the dog clutch 39 and the respective grooves provided between the teeth of the facing surface of the forward-side driven gear 37 at a time when the dog clutch 39 meets the forward-side driven gear 37 and thus increase the possibility that the teeth of the front end of the dog clutch 39 smoothly enter the respective grooves provided between the teeth of the facing surface of the forward-side driven gear 37. With this process, it is similarly expected to reduce the number of repetitions of the series of processes described above, and it is thus possible to significantly reduce or prevent the harness connected to the actuator motor 26 from generating heat.

Figure 10:
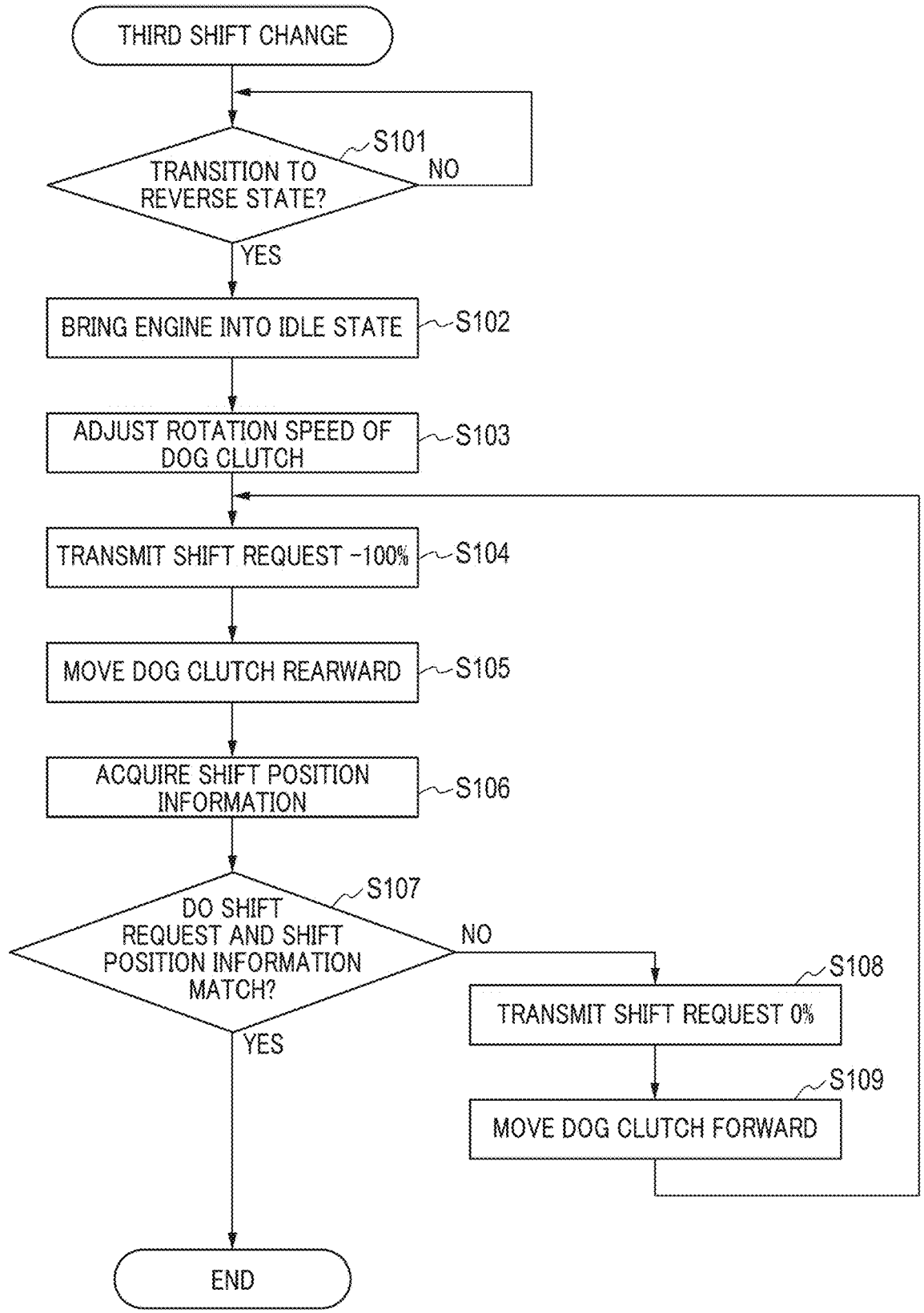
FIG. 10 is a flowchart illustrating a third shift change process.

FIG. 10 is a flowchart of the third shift change process using a method of switching the drive sources of the marine propulsion device according to the present preferred embodiment. The process illustrated in FIG. 10 is carried out by the AHECU 28 executing a control program stored in advance in a memory or a non-transitory computer readable medium (which is not shown) when switching the shift state of the outboard motor 12 from the neutral state to the reverse state.

In the flowchart of FIG. 10, in response to the vessel operator operating the operation lever 15b of the remote controller 15, the AHECU 28 determines whether or not the operation lever 15b has been moved from R1 to R2 to request a transition of the shift state of the outboard motor 12 from the neutral state to the reverse state (Step S101).

In step S101, if the transition from the neutral state to the reverse state is not requested, the process returns to step S101, and the AHECU 28 continues the determination. If the transition from the neutral state to the reverse state is requested, the AHECU 28 first brings the engine 16 into the idle state (Step S102). At this time, as described above, the remote controller 15 transmits a shift amount of −100% as a shift request to the AHECU 28. Thereafter, the AHECU 28 uses the electric motor 17 to adjust the rotation speed of the dog clutch 39 rotated by the electric motor 17 via the electric motor-side clutch mechanism 23, the shift slider 21, and the propeller shaft 20 so as to substantially match the rotation speed of the reverse-side driven gear 38 rotated by the engine 16 (Step S103). However, at this time, the AHECU 28 brings the rotation speed of the dog clutch 39 close to the rotation speed of the reverse-side driven gear 38, but does not cause the rotation speed of the dog clutch 39 to completely match the rotation speed of the reverse-side driven gear 38.

Subsequently, the AHECU 28 transmits, to the ECU 27 the shift request (shift amount of −100%) transmitted from the remote controller 15 (Step S104), and the ECU 27 causes the shift link mechanism 24 to move the dog clutch 39 axially rearward (Step S105). At this time, the shift state of the outboard motor 12 attempts to change from the neutral state illustrated in FIG. 3 to the reverse state illustrated in FIG. 5.

Thereafter, the ECU 27 acquires shift position information indicating the position of the shift rod 31 detected by the actuator 25 (Step S106). As for the shift position information, the actuator 25 outputs the shift amount of −100% in a case that the shift state of the outboard motor 12 is successfully switched to the reverse state, and outputs the shift amount of −50% in a case that the teeth of the rear end of the dog clutch 39 fail to enter the respective grooves provided between the teeth of the facing surface of the reverse-side driven gear 38 and the shift state of the outboard motor 12 is not switched to the reverse state, as described above. In a case that the shift state of the outboard motor 12 is not switched to the reverse state, the actuator 25 may output, as the shift position information, the progress rate corresponding to the actual operation amount of the actuator 25, for example.

The ECU 27 then transfers the acquired shift position information to the AHECU 28, and the AHECU 28 having received the shift position information determines whether or not the shift amount of the shift request matches the shift amount of the shift position information (Step S107).

In step S107, if the shift amount of the shift request and the shift amount of the shift position information are both −100% and thus match each other, the AHECU 28 ends the present process on an assumption that the shift state of the outboard motor 12 has been switched to the reverse state. On the other hand, if the shift amount of the shift position information is not −100% and the shift amount of the shift request and the shift amount of the shift position information do not match each other, the AHECU 28 transmits a shift amount of 0% as a shift request to the ECU 27 on an assumption that the shift state of the outboard motor 12 has not successfully switched to the reverse state (Step S108).

Next, the ECU 27 having received the shift request (shift amount of 0%) uses the shift link mechanism 24 to temporarily interrupt the axially rearward movement of the dog clutch 39 and move the dog clutch 39 axially forward (Step S109). At this time, the shift state of the outboard motor 12 returns to the reverse state illustrated in FIG. 5, and the dog clutch 39 moves back in the direction of the movement start position (second position) at which the movement is started in step S105. That is, the switching of the shift state of the outboard motor 12 from the neutral state to the reverse state is temporarily interrupted. At this time, it is not necessary for the dog clutch 39 to completely return to the movement start position, and it is sufficient for the dog clutch 39 to return to at least the position where the teeth of the rear end of the dog clutch 39 is separated from the teeth of the facing surface of the reverse-side driven gear 38.

After step S109, the process returns to step S104, in which the AHECU 28 transmits, to the ECU 27, the shift request (shift amount of −100%) having been transmitted from the remote controller 15, and moves the dog clutch 39 axially rearward again to attempt to switch the shift state of the outboard motor 12 from the neutral state to the reverse state.

That is, the series of processes in steps S104, S105, S106, S107 (NO), S108, and S109 is repeated unless the shift state of the outboard motor 12 is successfully switched to the reverse state. Here, as described above, the rotation speed of the dog clutch 39 does not completely match the rotation speed of the reverse-side driven gear 38, which changes the relative position between the teeth of the rear end of the dog clutch 39 and the corresponding grooves provided between the teeth of the facing surface of the reverse-side driven gear 38 with the lapse of time. Accordingly, when the ECU 27 moves the dog clutch 39 axially rearward again, the teeth of the rear end of the dog clutch 39 are able to smoothly enter the respective grooves provided between the teeth of the facing surface of the reverse-side driven gear 38 eventually. Therefore, by repeating the series of processes in steps S104, S105, S106, S107 (NO), S108, and S109, the teeth at the rear end of the dog clutch 39 are able to smoothly enter the respective grooves provided between the teeth of the facing surface of the reverse-side driven gear 38, and as a result, the AHECU 28 smoothly switches the shift state of the outboard motor 12 from the neutral state to the reverse state.

The process may return to step S104 after a certain period of delay time has elapsed after step S109 (i.e., the AHECU 28 may cause the dog clutch 39 to move toward the reverse-side driven gear 38 again after a certain period of delay time has elapsed), so as to intentionally change the relative position between the teeth of the rear end of the dog clutch 39 and the respective grooves provided between the teeth of the facing surface of the reverse-side driven gear 38 at a time when the dog clutch 39 meets the reverse-side driven gear 38 and thus increase the possibility that the teeth of the rear end of the dog clutch 39 smoothly enter the respective grooves provided between the teeth of the facing surface of the reverse-side driven gear 38. With this process, it is similarly expected to reduce the number of repetitions of the series of processes described above, and it is thus possible to significantly reduce or prevent the harness connected to the actuator motor 26 from generating heat.

Figure 11:
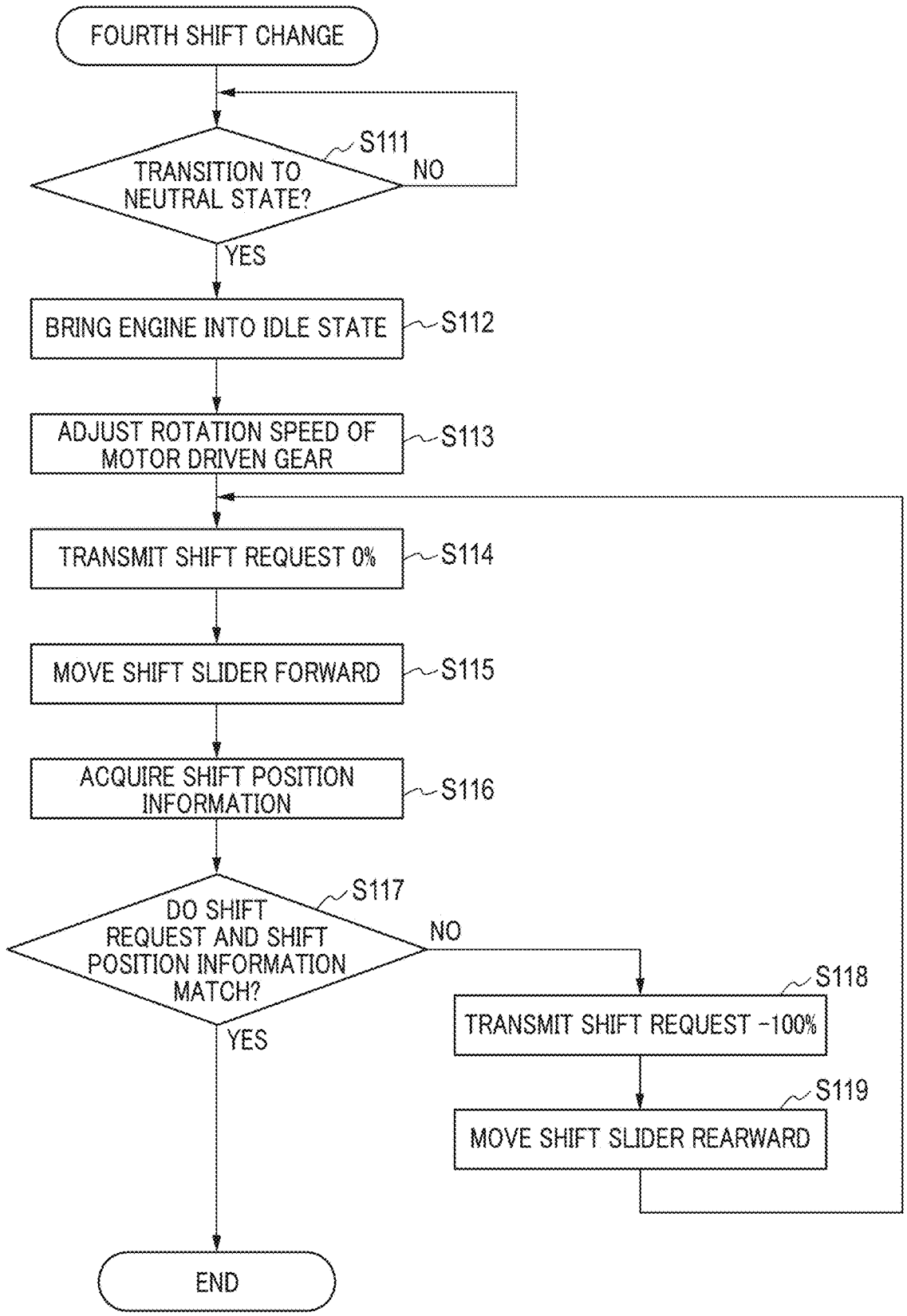
FIG. 11 is a flowchart illustrating a fourth shift change process.

FIG. 11 is a flowchart of the fourth shift change process using a method of switching the drive sources of the marine propulsion device according to the present preferred embodiment. The process of FIG. 11 is carried out by the AHECU 28 executing a control program stored in advance in a memory or a non-transitory computer readable medium (which is not shown) when switching the shift state of the outboard motor 12 from the reverse state to the neutral state.

In the flowchart of FIG. 11, in response to the vessel operator operating the operation lever 15*b* of the remote controller 15, the AHECU 28 determines whether or not the operation lever 15*b* has been moved from R2 to R1 to request a transition of the shift state of the outboard motor 12 from the reverse state to the neutral state (Step S111).

In step S111, if the transition from the reverse state to the neutral state is not requested, the process returns to step S111, and the AHECU 28 continues the determination. If the transition from the reverse state to the neutral state is requested, the AHECU 28 first brings the engine 16 into the idle state (Step S112). At this time, as described above, the remote controller 15 transmits a shift amount of 0% as a shift request to the AHECU 28. Thereafter, the AHECU 28 uses the electric motor 17 to adjust the rotation speed of the motor driven gear 35 rotated by the electric motor 17 so as to substantially match the rotation speed of the shift slider 21 rotated by the engine 16 via the engine-side clutch mechanism 22 and the propeller shaft 20 (Step S113). However, also at this time, the AHECU 28 brings the rotation speed of the motor driven gear 35 close to the rotation speed of the shift slider 21, but does not cause the rotation speed of the motor driven gear 35 to completely match the rotation speed of the shift slider 21.

Subsequently, the AHECU 28 transmits, to the ECU 27 the shift request (shift amount of 0%) transmitted from the remote controller 15 (Step S114), and the ECU 27 causes the shift link mechanism 24 to move the shift slider 21 axially forward (Step S115). At this time, the shift state of the outboard motor 12 attempts to change from the reverse state illustrated in FIG. 5 to the neutral state illustrated in FIG. 3.

Thereafter, the ECU 27 acquires shift position information indicating the position of the shift rod 31 detected by the actuator 25 (Step S116). As for the shift position information, as described above, the actuator 25 outputs the shift amount of 0% in a case that the shift state of the outboard motor 12 is successfully switched to the neutral state, and outputs the shift amount of −50% in a case that the shift state of the outboard motor 12 is not switched from the reverse state to the neutral state. In a case that the shift state of the outboard motor 12 is not switched to the neutral state, the actuator 25 may output, as the shift position information, the progress rate corresponding to the actual operation amount of the actuator 25, for example.

The ECU 27 then transfers the acquired shift position information to the AHECU 28, and the AHECU 28 having received the shift position information determines whether or not the shift amount of the shift request matches the shift amount of the shift position information (Step S117).

In step S117, if the shift amount of the shift request and the shift amount of the shift position information are both 0% and thus match each other, the AHECU 28 ends the present process on an assumption that the shift state of the outboard motor 12 has been switched to the neutral state. On the other hand, if the shift amount of the shift position information is not 0% and the shift amount of the shift request and the shift amount of the shift position information do not match each other, the AHECU 28 transmits a shift amount of −100% as a shift request to the ECU 27 on an assumption that the shift state of the outboard motor 12 has not successfully switched to the neutral state (Step S118).

Next, the ECU 27 having received the shift request (shift amount of −100%) uses the shift link mechanism 24 to temporarily interrupt the axially forward movement of the shift slider 21 and move the shift slider 21 axially rearward (Step S119). At this time, the shift state of the outboard motor 12 returns to the reverse state illustrated in FIG. 5, and the shift slider 21 moves back in the direction of the movement start position (first position) at which the movement is started in step S115. That is, the switching of the shift state of the outboard motor 12 from the reverse state to the neutral state is temporarily interrupted. At this time, it is not necessary for the shift slider 21 to completely return to the movement start position, and it is sufficient for the shift slider 21 to return to at least the position where the engaged teeth 21a are separated from the engaging teeth 35d of the motor driven gear 35.

After step S119, the process returns to step S114, in which the AHECU 28 transmits to the ECU 27 the shift request (shift amount of 0%) having been transmitted from the remote controller 15, and moves the shift slider 21 axially forward again to attempt to switch the shift state of the outboard motor 12 from the reverse state to the neutral state. That is, the series of processes in steps S114, S115, S116, S117 (NO), S118, and S119 is repeated unless the shift state of the outboard motor 12 is successfully switched to the neutral state. Here, as described above, the rotation speed of the motor driven gear 35 and the rotation speed of the shift slider 21 do not completely match each other, which changes the relative position between the engaged teeth 21a and the corresponding engaging grooves 35e with the lapse of time. Accordingly, when the ECU 27 moves the shift slider 21 axially forward again, the engaged teeth 21a are able to smoothly enter the respective engaging grooves 35e eventually. Therefore, by repeating the series of processes in steps S114, S115, S116, S117 (NO), S118, and S119, the engaged teeth 21a are able to smoothly enter the respective engaging grooves 35e, and as a result, the AHECU 28 smoothly switches the shift state of the outboard motor 12 from the reverse state to the neutral state.

The process may return to step S114 after a certain period of delay time has elapsed after step S119 (i.e., the AHECU 28 may cause the shift slider 21 to move toward the motor driven gear 35 again after a certain period of delay time has elapsed), so as to intentionally change the relative position between the engaged teeth 21a and the respective engaging grooves 35e at a time when the shift slider 21 meets the motor driven gear 35 and thus increase the possibility that the engaged teeth 21a smoothly enter the respective engaging grooves 35e. With this process, it is similarly expected to reduce the number of repetitions of the series of processes described above, and it is thus possible to significantly reduce or prevent the harness connected to the actuator motor 26 from generating heat.

According to the processes illustrated in FIGS. 8 to 11, since the AHECU 28 smoothly switches the shift state of the outboard motor 12, it is possible to avoid repetition of collision between the engaged teeth 21a of the shift slider 21 and the respective engaging teeth 35d of the motor driven gear 35, and repetition of collision between the teeth of the end portion of the dog clutch 39 and the respective teeth of the facing surface of the forward-side driven gear 37 or the reverse-side driven gear 38, and it is thus possible to significantly reduce or prevent abnormal noise from occurring. Furthermore, since the movement of the shift slider 21 or the dog clutch 39 is not continued when the switching of the shift state is not successful, it is possible to significantly reduce or prevent a large load from being applied to the actuator 25 and the actuator motor 26 of the shift link mechanism 24.

In the above-described preferred embodiments, when switching the shift state of the outboard motor 12, the AHECU 28 brings the engine 16 into the idle state. However, the rotation speed of the engine 16 at the time of switching the shift state is not limited to the rotation speed of idling and can be determined freely as far as the rotation speed of the motor driven gear 35 rotated by the electric motor 17 is adjusted so as to substantially match the rotation speed of the shift slider 21 rotated by the engine 16 or the rotation speed of the dog clutch 39 rotated by the electric motor 17 is adjusted so as to substantially match the rotation speed of the forward-side driven gear 37 or the reverse-side driven gear 38 rotated by the engine 16.

In the above-described preferred embodiments, the AHECU 28 interrupts switching of the shift state temporarily (for a predetermined period of time) in a case that the switching of the shift state is not smoothly performed in all of the switching of the shift state from the neutral state to the forward state, the switching of the shift state from the neutral state to the reverse state, the switching of the shift state from the forward state to the neutral state, and the switching of the shift state from the reverse state to the neutral state. However, the AHECU 28 may omit temporary interruption (interruption for the predetermined period of time) of the switching of the shift state in the switching of the shift state in which the edge of each tooth to be engaged is tapered to easily mesh.

Furthermore, marine propulsion devices to which preferred embodiments of the present invention are applicable is not limited to outboard motors, and preferred embodiments of the present invention are also applicable to inboard/outboard motors (stern drive, inboard motor/outboard drive) and inboard motors including a mechanism that switches between an engine and an electric motor as a drive source.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive source switching system for a marine propulsion device, the drive source switching system comprising:
    a first drive source;
    a second drive source;
    a propeller shaft to rotate propeller blades to generate a propulsive force;
    a first driving member to transmit a drive force generated by the first drive source;
    a second driving member to transmit a drive force generated by the second drive source;
    a first driven member that is movable in an axial direction of the propeller shaft and engageable with the first driving member;
    a second driven member that is movable in the axial direction of the propeller shaft and engageable with the second driving member; and
    a controller configured or programmed to control a movement of the first driven member; wherein
    the first driven member transmits the drive force generated by the first drive source to the propeller shaft when engaged with the first driving member;
    the second driven member transmits a drive force generated by the second drive source to the propeller shaft when engaged with the second driving member; and
    when the controller controls the first driven member to move from a first position, where the first driven member is not engaged with the first driving member, in the axial direction of the propeller shaft toward the first driving member, the controller controls the first driven member to be driven back in a direction toward the first position when the first driven member fails to be engaged with the first driving member.

2. The system according to claim 1, wherein when the first driven member fails to engage with the first driving member, the controller controls the first driven member to move the first driven member back in the direction toward the first position and then move the first driven member toward the first driving member again.

3. The system according to claim 2, wherein when the first driven member fails to engage with the first driving member, the controller controls the first driven member to move the first driven member back in the direction toward the first position and then move the first driven member toward the first driving member again after a predetermined period of delay time has elapsed.

4. The system according to claim 1, wherein
    the controller is further configured or programmed to control a movement of the second driven member; and
    when the controller controls the second driven member to move the second driven member from a second position, where the second driven member is not engaged with the second driving member, in the axial direction of the propeller shaft toward the second driving member, the controller controls the second driven member to move the second driven member back in a direction toward the second position when the second driven member fails to engage with the second driving member.

5. The system according to claim 4, wherein when the second driven member fails to engage with the second driving member, the controller controls the second driven member to move the second driven member back in the direction toward the second position and then move the second driven member toward the second driving member again.

6. The system according to claim 5, wherein when the second driven member fails to engage with the second driving member, the controller controls the second driven member to move the second driven member back in the direction toward the second position and then move the second driven member toward the second driving member again after another predetermined period of delay time has elapsed.

7. The system according to claim 4, wherein
    when the first driving member and the first driven member are engaged with each other, the second driving member and the second driven member are not engaged with each other; and
    when the second driving member and the second driven member are engaged with each other, the first driving member and the first driven member are not engaged with each other.

8. The system according to claim 1, further comprising:
    a movement mechanism to move the first driven member or the second driven member in the axial direction of the propeller shaft; wherein
    the movement mechanism is driven by an electric motor.

9. The system according to claim 1, wherein the first driven member is movable along a rotation axis of the propeller shaft.

10. The system according to claim 1, wherein the first drive source is an electric motor, and the second drive source is an internal combustion engine.

11. The system according to claim 10, wherein
    the first driving member and the first driven member rotate about an axis of the propeller shaft; and
    when the controller controls the first driven member to move from the first position in the axial direction of the propeller shaft toward the first driving member, the controller controls the electric motor to bring a rotation speed of the first driving member to substantially match a rotation speed of the first driven member.

12. The system according to claim 11, wherein when the rotation speed of the first driving member substantially matches the rotation speed of the first driven member, the controller does not completely match the rotation speed of the first driving member with the rotation speed of the first driven member.

13. The system according to claim 11, wherein when the controller controls the first driven member to move from the first position in the axial direction of the propeller shaft toward the first driving member, the internal combustion engine rotates the first driven member via the second driving member, the second driven member, and the propeller shaft, and the internal combustion engine is brought into an idle state.

14. The system according to claim 1, wherein the marine propulsion device is an outboard motor.

15. A drive source switching system for a marine propulsion device, the drive source switching system comprising:
- a first drive source;
- a second drive source;
- a propeller shaft to rotate propeller blades to generate a propulsive force;
- a drive source switching mechanism to switch, between the first drive source and the second drive source, a drive source that generates a drive force to be transmitted to the propeller shaft; and
- a controller configured or programmed to control the drive source switching mechanism to switch the drive source between the first drive source and the second drive source; wherein
- when switching the drive source between the first drive source and the second drive source fails, the controller interrupts the switching of the drive source between the first drive source and the second drive source.

16. The system according to claim 15, wherein when the switching of the drive source between the first drive source and the second drive source fails, the controller interrupts the switching of the drive source between the first drive source and the second drive source and then attempts the switching of the drive source between the first drive source and the second drive source again.

17. A method of switching drive sources of a marine propulsion device including a first drive source, a second drive source, a propeller shaft to rotate propeller blades to generate a propulsive force, a drive source switching mechanism to switch between the first drive source and the second drive source a drive source to generate a drive force to be transmitted to the propeller shaft, and a controller, the method comprising:
- controlling, with the controller, the drive source switching mechanism to switch the drive source between the first drive source and the second drive source; and
- when switching the drive source between the first drive source and the second drive source fails, interrupting, with the controller, switching the drive source between the first drive source and the second drive source.

18. The method according to claim 17, further comprising:
- when the switching of the drive source between the first drive source and the second drive source fails, interrupting the switching of the drive source between the first drive source and the second drive source, and then attempting the switching of the drive source between the first drive source and the second drive source again.

* * * * *